United States Patent

[11] 3,599,499

[72] Inventor Francis Steiner
     10 rue des Chataigners, 91 Verriere Le Buisson, France
[21] Appl. No. 775,882
[22] Filed Nov. 14, 1968
[45] Patented Aug. 17, 1971

[54] CONTROL DEVICES
     8 Claims, 4 Drawing Figs.
[52] U.S. Cl. .................................................... 74/89.15
[51] Int. Cl. ....................................................... F16h 27/02
[50] Field of Search ........................................... 74/89.15, 424.8 B, 142, 335, 626; 92/13

[56] References Cited
UNITED STATES PATENTS
| | | | |
|---|---|---|---|
| 692,345 | 2/1902 | Rauhoff ...................... | 74/89.15 |
| 2,966,143 | 12/1960 | Panza ........................... | 92/13 |
| 1,971,141 | 8/1934 | Holst ............................ | 74/142 |
| 2,597,357 | 5/1952 | McCormick ................ | 74/335 |
| 3,363,480 | 1/1968 | Murphy ...................... | 74/626 |

Primary Examiner—William F. O'Dea
Assistant Examiner—Wesley S. Ratliff, Jr.
Attorney—Fishman and Van Kirk ABSTRACT: A control apparatus having an adjustable gain or transmission ratio. The apparatus has a controlling device which accepts an input quantity and a controlled or output device which produces an output quantity. A regulator is interposed between the controlling and the controlled devices. The regulator has an adjustable transmission ratio which is varied in response to the magnitude of the output quantity.

CONTROL DEVICES

The invention relates to control devices and has the object of correcting in a device of this type the regulating quantity between the actual control device and the controlled device in order to compensate in whole or in part for the disturbing variable originating from the load and possibly from the control device itself.

With this object in mind the invention consists in utilizing a device making it possible to modify the regulating quantity in dependence on the magnitude of the load.

The invention will be better understood from the description given below which refers to one particular embodiment thereof, although the applicants do not intend to limit the generic scope of their invention to or by the features specific to the example selected as an illustration.

The example selected comprises the case of a shaft servo-controlled by a drive shaft, and more particularly the case where amplification is employed between the input movement and the output movement.

Figure 1:
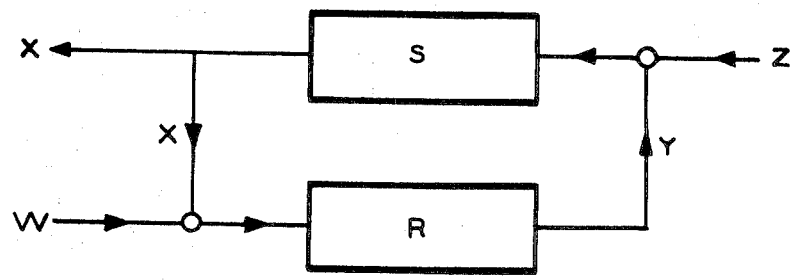
Figure 2:
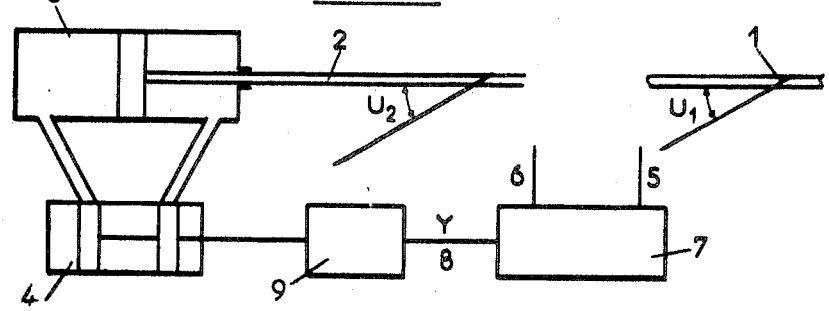
Figure 3:
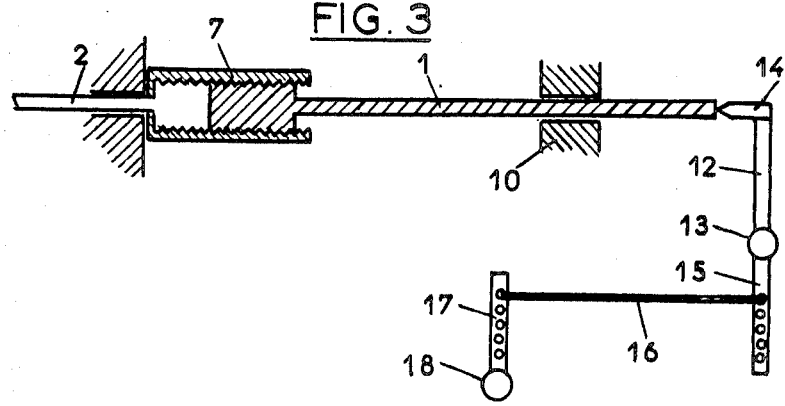
Figure 4:
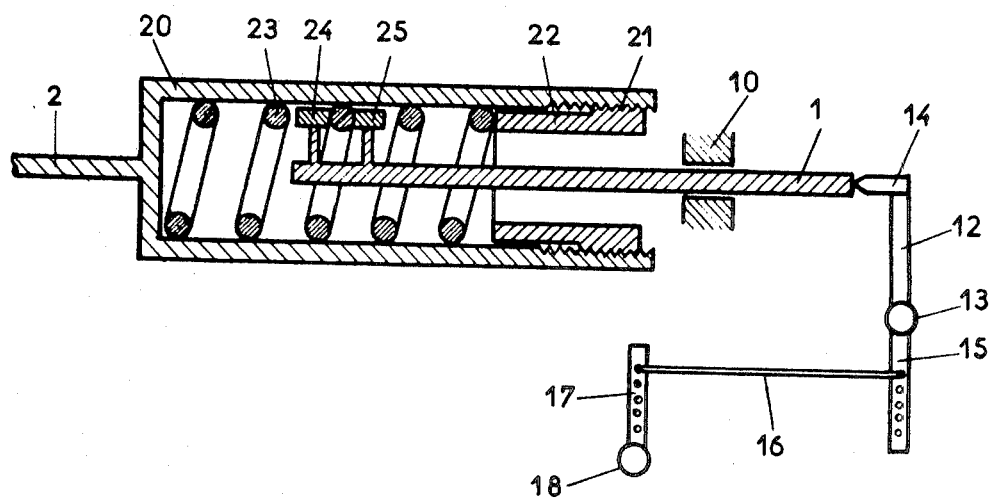

In the accompanying drawings,

FIG. 1 is a diagram explaining the invention,

FIG. 2 a diagram relating to the example of embodiment of the invention,

FIG. 3 an explanatory diagram,

FIG. 4 a diagram illustrating a mechanical device used for carrying out the invention.

In FIG. 1 there is shown the conventional diagram of a control device in a very general form. In this diagram, R represents the control device proper, S the controlled device, Y the regulating quantity, W the input quantity, and X the output quantity which is returned to the control device.

Z designates the disturbing variable, which in the general case is a condition extrinsic and/or intrinsic to the system.

According to the invention, which is illustrated by the same diagram, instead of being a condition of the problem, Z is a means which is advantageously utilized whenever the magnitude of the load, that is to say in practice the magnitude of X is capable of having an influence on the sensitivity or fidelity of the system as a whole.

More particularly, according to the invention the quantity Z voluntarily introduced into the system is dependent on the magnitude of the load.

In FIG. 2, which is more specific to the example selected, 1 designates the input shaft, 2 the output shaft which is driven by the hydraulic motor 3 serving as amplifier, said motor being in turn driven by the distributor 4.

From an arbitrary fixed direction the respective angles of rotation $U_1$ and $U_2$ of the shafts 1 and 2 are measured. The two quantities enter the comparator 7 by way of 5 and 6 respectively in order to provide at the output 8 the regulating quantity Y, which in known installations of this type drives the distributor 4 directly, whereas according to the invention a device 9 capable of being controlled in dependence on the load supported by the shaft 2 is interposed between the output 8 and the distributor 4.

As has just been stated, installations comprising the devices represented symbolically by 1—8 in FIG. 2 are in the public domain, and various types of such installations exist. Similarly, with regard to the device 9 there will be found in the prior art various types of devices making it possible to modify under static or dynamic conditions the transmission ratio between the output shaft of the comparator and the shaft controlling the distributor, in an adjustable manner.

There is nevertheless illustrated in FIG. 3, in diagrammatical form, an example of a mechanical device permitting manual adjustment of this transformation ratio.

In this Figure, the references 1 and 2 are used again for the input and output shafts, and the comparator 7 is of the screw and nut type, the nut being secured to the shaft 2 and the screw to the shaft 1. It has been assumed that the input shaft 1 is capable of performing a movement of translation in the bearing illustrated diagrammatically at 10. The result of this arrangement is that any relative variation in the rotation of the two shafts will effect a movement of translation of the shaft 1, that is to say a movement of the lever 12, pivoting at its center about the fixed point 13, the end 14 of said lever bearing against the end face of the shaft 1 or else against a collar mounted on said shaft.

The second branch 15 of the lever 12 is provided with a series of holes enabling the connecting rod 16 to be articulated at a variable distance from the point 13. The connecting rod 16 is articulated on the lever 17, which in turn is articulated on the shaft 18 driving the movable portion of the distributor 4 (not illustrated in this Figure). If necessary, the lever 17 could be provided with a series of holes likewise enabling the connecting rod 16 to be articulated at different distances from the shaft 18.

The combination of the devices 7 and 9 which has just been described may undergo a very large number of modifications, which form part of the present state of the art.

On the other hand, there is illustrated in FIG. 4 a new variant of this combination, which must be regarded as a complementary part of the invention constituting the main object of the application.

Retaining the same references as in the preceding Figures, 1 designates the input shaft and 2 the shaft of the hydraulic motor, the reference 10 likewise being retained for the bearing. A hollow cylindrical body 20 is secured to the shaft 2. At the opposite end the bore of the body 20 has an internal screw thread 21, in which the nut 22 is screwed. A coil spring 23 is contained inside the body 20 and bears against the nut 22, the elongation and consequently the pitch of which spring can be adjusted by screwing the nut 22 to a greater or lesser extent into the body 20. The input shaft 1 penetrates into the body in the axial direction, passing through the nut 22, which has an adequate bore to enable said shaft to pass through freely. By means of two small rollers 24 and 25 the shaft 1 bears against a turn of the spring 23, and consequently a differential rotation of the two shafts will effect a movement of translation of the shaft 1 by means of the variable, adjustable pitch screw constituted by the coil spring 23.

The advantage of the invention to the manufacturer is that it makes it possible to manufacture a single type of control device to serve an entire range of controls, in which the normal specified load may extend over a fairly wide range. For the user the advantage is that with a single apparatus he can perform tasks involving different loads.

Without departing from the scope of the invention it is moreover possible to handle continuously and automatically loads which are variable in respect of time in the course of utilization. It is possible for the magnitude of the load to be continuously measured and for the regulation of the modifying device to be continuously corrected in dependence on this measurement. In this case it is for example possible to use a differential to control a distributor, which will then preferably be of the type comprising a differential rotary slide, in which the angular movement of one input wheel will be controlled by the control device and the angular movement of the second input wheel will be controlled by the output movement of the apparatus measuring the magnitude of the load.

SUMMARY

The invention has as object:

1. In a control device, a method of holding or partly compensating for the disturbing variable originating from the load and possibly from the control device itself, characterized in that the regulating quantity is modified, between the control device proper and the controlled device, in dependence on the magnitude of the load.

2. A control device comprising between the control device and the controlled device a device permitting modification of the regulating quantity in dependence on the load.

3. A device according to 2, in which the modifying device is of the screw and nut type.

4. A modifying device according to 3, in which use is made of a variable pitch coil spring against the turns of which a follower bears.

I claim:

1. Apparatus for controlling a device which produces an output quantity in response to an input quantity comprising:
    means for comparing the output quantity with the input quantity to produce a regulating quantity, said comparing means including a rotatable assembly having a helical track and a follower engaging said track;
    means connected to said comparing means follower for transmitting the regulating quantity at an adjustable transmission ratio to the device which produces the output quantity; and
    means responsive to the output quantity for adjusting the transmission ratio of the transmitting means in response to the magnitude of the output quantity.

2. The apparatus of claim 1 wherein:
    the helical track in the comparing means has an adjustable pitch; and
    the means for adjusting the transmission ratio varies the pitch of the helical track.

3. The apparatus of claim 2 wherein:
    the helical track in the comparing means is a coil spring;
    the follower of the comparing means engages the convolutions or turns of the coil spring; and
    the means for adjusting the pitch of the helical track adjusts the length of the coil spring.

4. Apparatus for controlling the position of a device which produces an output quantity in response to an input quantity comprising:
    mechanical means for comparing the output quantity with the input quantity to produce a regulating quantity; and
    means connected with the comparing means for transmitting the regulating quantity to the device which produces the output quantity, said transmitting means including pivotable lever means, said lever means being mechanically coupled to said device, the point at which said mechanical coupling connects to said lever means being manually adjustable whereby selection of the transmission ratio is permitted.

5. The apparatus of claim 4 wherein said mechanical comparing means comprises:
    a rotatable assembly having a helical track and a follower engaging said track.

6. The apparatus of claim 5 wherein the helical track in said rotatable assembly has an adjustable pitch and wherein said transmitting means varies the pitch of the helical track.

7. The apparatus of claim 6 wherein the helical track defining portion of said comparing means comprises:
    a coil spring.

8. The apparatus of claim 7 wherein the follower portion of said comparing means engages the convolutions of said spring and wherein said transmitting means is mechanically coupled to said spring and adjusts the length thereof commensurate with the position of said lever means.